March 31, 1931.  F. H. SCHRADER  1,799,025

BLOW-OFF COCK VALVE

Filed June 3, 1929

Frank H. Schrader
INVENTOR

BY Victor J. Evans
ATTORNEY

WITNESS:

Patented Mar. 31, 1931

1,799,025

UNITED STATES PATENT OFFICE

FRANK H. SCHRADER, OF TULSA, OKLAHOMA

BLOW-OFF COCK VALVE

Application filed June 3, 1929. Serial No. 367,998.

My present invention has reference to a blow-off cock valve for boilers, and my object is the provision of a device for this purpose that is constructed of parts or sections so that the same may be readily disassociated and replaced by other parts when worn.

A still further and important object is the provision of a cock valve for this purpose that shall be provided with a removable valve seat, together with means for preventing the valve being scaled by the dirty water or sediment let out of the boiler getting under the valve seat.

To the attainment of the foregoing and many other objects which will present themselves, the improvement also resides in the following details of construction, and operative association of parts, one satisfactory embodiment of which is disclosed by the accompanying drawings.

Figure 1:
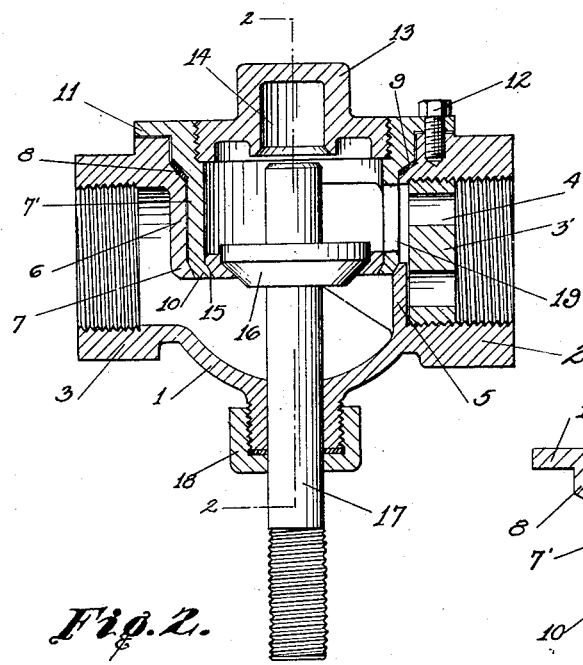
Figure 1 is an approximately central vertical longitudinal sectional view through a blow-off cock valve in accordance with this invention.
Figure 3:
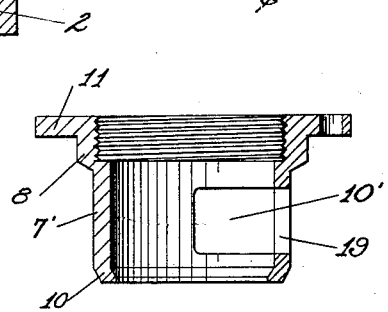
Figure 3 is a sectional view through the cage.
Figure 2:
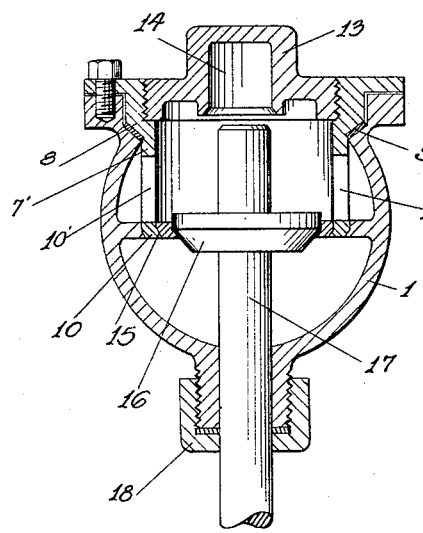
Figure 2 is a sectional view taken approximately on the line 2—2 of Figure 1.
Figure 4:
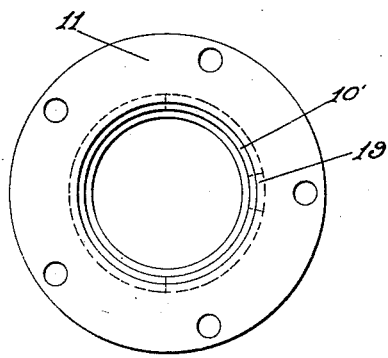
Figure 4 is a top plan view thereof.

The valve body is indicated in the drawings by the numeral 1. The body is integrally formed on both of its ends with hubs 2 and 3 which are interiorly threaded for the reception of the pipe that leads from the boiler and the outlet pipe. In the hub 2 there is screwed a ring 3' which is apertured, as at 4, the said ring abutting an extension or partition 5 that is integrally formed with the valve body 1. The hub 3 at its inner end is formed with a partition 6 substantially similar to the partition 5 but directly opposite thereto and the said partitions or walls 5 and 6 forming at their inner ends an opening surrounded by a tapered seat 7.

There is received in an opening in the top of the valve the body portion of a cage 7'. The cage is in the nature of a cylindrical member but has its upper portion thickened and formed with an angle shoulder 8 designed to be arranged opposite similar shoulders in the valve body and between these shoulders there is arranged a compressible packing ring 9. The cage has its lower end tapered inwardly, as at 10. The body of the cage is formed with a pair of spaced openings 10' that aline with the opening in the hub 2, or rather with the apertures in the ring that is screwed in the hub. The top of the cage is flanged, as at 11, and there is passed through suitable openings in the said flange the shanks of headed bolts 12 which are screwed in openings in the top of the valve body.

The cage is provided with interior threads at the outer end thereof and in these threads there is screwed a plug 13 that has a central hollow portion 14 entering from its inner face.

Arranged on the tapered end 10 of the cage 7' there is a removable valve seat 15 to be engaged by a valve 16. The valve is round in plan and has an inwardly tapered end to correspond with the inner wall of the valve seat and the valve is, of course, provided with a stem 17, one end of which passes through a packing box 18 that is screwed to the bottom of the valve body or casing 1 and the other end is arranged in a line with the recess or pocket 14 in the plug 13.

The blow-off cock valve is secured to a boiler adjacent to the base thereof, either to the front or to the side of the said boiler. The pressure of water from the boiler will hold the valve closed and any suitable means may be provided for unseating the valve, thus permitting the water from the boiler to flow through the apertured ring and through the valve seat and find an outlet through the hub 3.

It will be apparent that by unfastening the bolts 12 the cage, the seat and the valve may be withdrawn through the top of the valve body or casing, so that any repair to these parts may be easily and quickly made and such removal and repairs can be done by a single hand. The stem 17 of the valve may be turned by grinding the same on its seat and, of course, the seat is readily replaceable.

The partition 19 between the openings 10' in the cage 7' materially strengthens the said cage.

The simplicity of my construction and the advantages thereof will, it is thought, be readily understood and appreciated so that further detailed description is not thought required. It is, however, thought necessary to state that I do not wish to be restricted to the precise details of construction herein set forth and, therefore, hold myself entitled to make such changes therefrom as fairly fall within the scope of what I claim.

Having described the invention, I claim:

1. In a blow-off cock valve for the purpose set forth, a valve body having a movable valve therein, a removable seat for the valve, a removable supporting cage for the seat, a plug screwed on the outer end of the cage, and said cage having openings communicating with the inlet to the valve body and an apertured ring screwed in the inlet end of the body and having certain of its apertures arranged above the movable valve for communication with the openings in the cage.

2. A blow-off cock valve for boilers, including a body having one end adapted to be connected to a boiler and its other end providing an outlet, inwardly directed oppositely disposed partitions in the body forming an opening surrounded by a tapered seat, a removable cage fixed to and entering one side of the body, a plug for closing the outer open end of the cage, said cage having its lower end tapered inwardly and engaging said tapered seat, a valve seat for engaging said tapered end of the cage, a valve for engaging the valve seat and having a stem extending in opposite directions, one end of the stem passing through a packing box in the valve body and the other end of the stem being movable into the plug when the valve is unseated.

3. A blow-off cock valve for boilers, including a body having one end adapted to be connected to a boiler and its other end providing an outlet, inwardly directed oppositely disposed partitions in the body forming an opening surrounded by a tapered seat, a removable cage fixed to and entering one side of the body, a plug for closing the outer open end of the cage, said cage having its lower end tapered inwardly and engaging said tapered seat, a valve seat for engaging the tapered end of the cage, a valve engaging the valve seat and having a stem extending in opposite directions, one end of the stem passing through a packing box in the valve body and the other end of the stem being movable into the plug when the valve is unseated, and compressible means between the cage and the valve body.

In testimony whereof I affix my signature.

FRANK H. SCHRADER.